United States Patent [19]
Ko

[11] Patent Number: 6,012,476
[45] Date of Patent: Jan. 11, 2000

[54] PRESSURE BALANCER FOR USE IN A WATER INLET PASSAGE OF A MIXING FAUCET

[75] Inventor: Hsi-Chia Ko, Changhua Hsien, Taiwan

[73] Assignee: Chung-Cheng Faucet Co., Ltd., Changhua Hsien, Taiwan

[21] Appl. No.: 09/236,618

[22] Filed: Jan. 26, 1999

[51] Int. Cl.[7] .......................... G05D 11/03; F16K 11/074
[52] U.S. Cl. ..................... 137/98; 137/100; 137/625.4; 251/127
[58] Field of Search .................... 137/98, 100, 114, 137/607, 597, 625.17, 625.41, 625.4; 251/127

[56] References Cited

U.S. PATENT DOCUMENTS

| | | | |
|---|---|---|---|
| 4,157,099 | 6/1979 | Delker et al. | 251/127 |
| 4,301,836 | 11/1981 | Hunziker | 137/625.4 |
| 4,854,347 | 8/1989 | Knapp | 137/625.17 |
| 5,329,958 | 7/1994 | Bosio | 137/625.17 |
| 5,826,611 | 10/1998 | Ko. | |

*Primary Examiner*—Stephen Hepperle
*Attorney, Agent, or Firm*—Browdy and Neimark

[57] ABSTRACT

An improved pressure balancer is mounted to a water inlet passage of a mixing faucet. Its improvement is characterized by the adoption of a mixing chamber, defined at one end of a valve control shaft, in which a plurality of upright turbulence rods are disposed, and a pair of identical silencing screens that are fit in the mixing chamber at the same time so as to effectively reduce the operational noise of a faucet. Moreover, a threaded flange is provided next to the rubber diaphragm on a balance rod to allow a compression nut to be mounted to the balance rod with one side thereof in abutment against the diaphragm. Thus, the diaphragm can be protected from being overturned inside out as a result of excessive water pressure applied to the diaphragm in operation.

1 Claim, 5 Drawing Sheets

PRESSURE BALANCER FOR USE IN A WATER INLET PASSAGE OF A MIXING FAUCET

BACKGROUND OF THE INVENTION

The present invention relates to an improved pressure balancer used in a water inlet passage of a mixing faucet. The improvement lies in the adoption of a mixing chamber having a plurality of upright turbulence rods on the valve control shaft along with a pair of identical silencing screens that are fit in the mixing chamber so as to effectively reduce the operational noise of a faucet. Besides, a threaded flange is disposed next to the rubber diaphragm on a balance rod, permitting a compression nut to be mounted one side in abutment against the diaphragm. Thus, the diaphragm can be firmly protected from being overturned inside out as a result of excessive water pressure applied to the diaphragm in operation.

The present inventor obtained a U.S. Pat. No. 5,826,611 issued on Oct. 27, 1998 which is cited as a prior art in FIGS. 1, 2. This prior art pressure balancer of the present inventor basically has the same structure and operation mode as the present invention and its identical parts are numbered with the same reference numerals. So, it is not repeatedly described hereinafter. However, this prior art balancer has a number of disadvantages in its practical use which are given as below:

1. The rubber balance diaphragm 70 is easily turned inside out when the water pressure exerted thereon is in excess even the auxiliary fitting ring 80 is placed in limiting restraint with the balance diaphragm 70. Because the auxiliary fitting ring 80 can not hold the diaphragm 70 firmly in place.
2. There is annoying noise produced when water passes through the water passage.

SUMMARY OF THE INVENTION

Therefore, the primary object of the present invention is to provide an improved pressure balancer which is provided with a threaded flange next to the balance diaphragm at the middle of the balance rod for securing of a compression nut disposed in abutment against the diaphragm, preventing the same from being overturned under excessive water pressure.

Another object of the present invention is to provide an improved pressure balancer, which is provided with a silencing block at each end of countersink socket of the balance rod. The valve control shaft having a mixing chamber defined at one end is equipped with a plurality of upright turbulence rods in the mixing chamber in addition to a pair of silencing screens whereby noise produced by running water can be effectively reduced.

BRIEF DESCRIPTION OF THE DRAWINGS

FIG. 3A is a diagram showing the valve control shaft viewed from the other end thereof;

DETAILED DESCRIPTION OF THE PREFERRED EMBODIMENT

Figure 1:
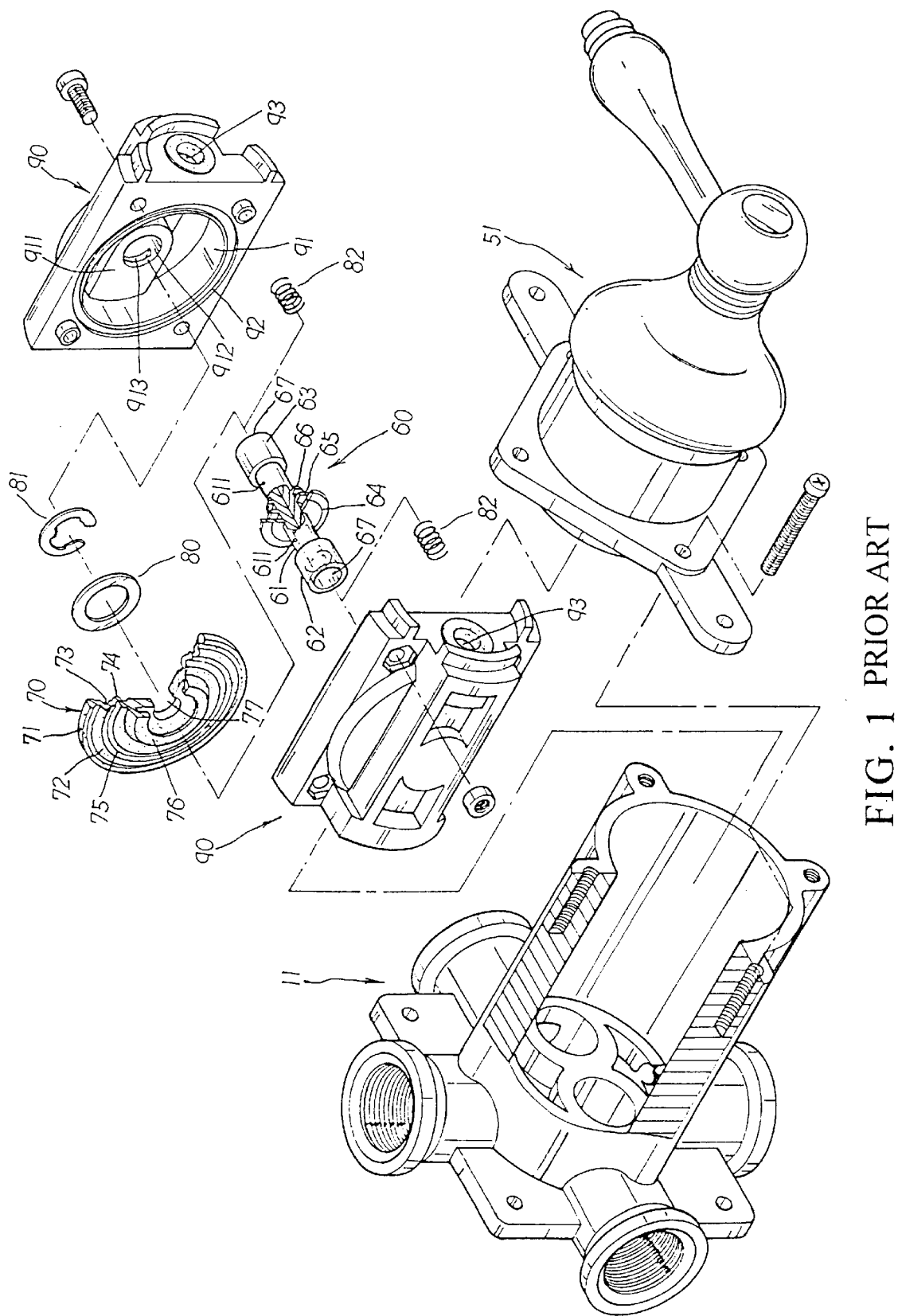
FIG. 1 is a perspective diagram showing the exploded components of a prior art pressure balancer mounted to a mixing faucet.
Figure 2:
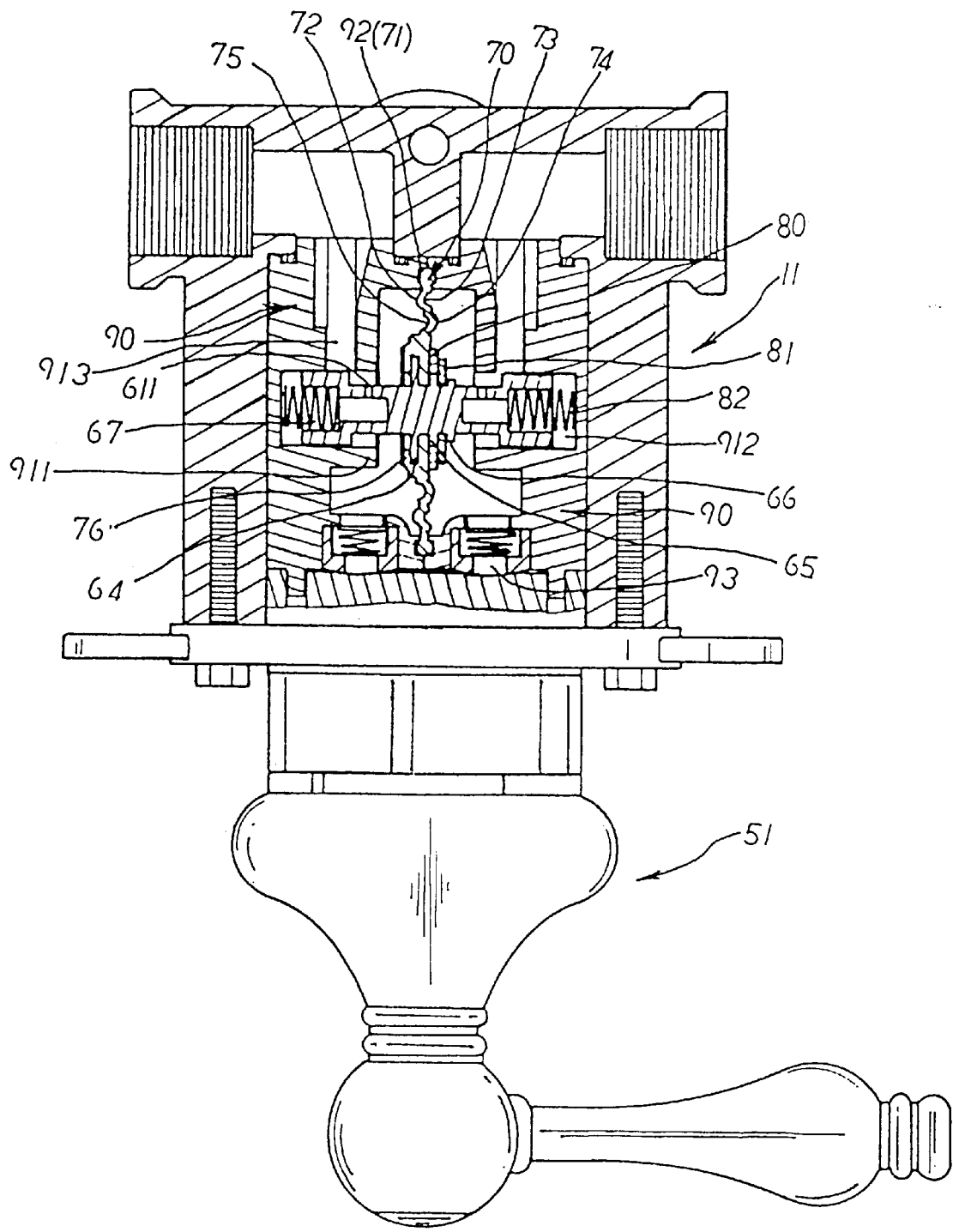
FIG. 2 is a sectional diagram showing the assembly of the prior art of FIG. 1.
Figure 3:
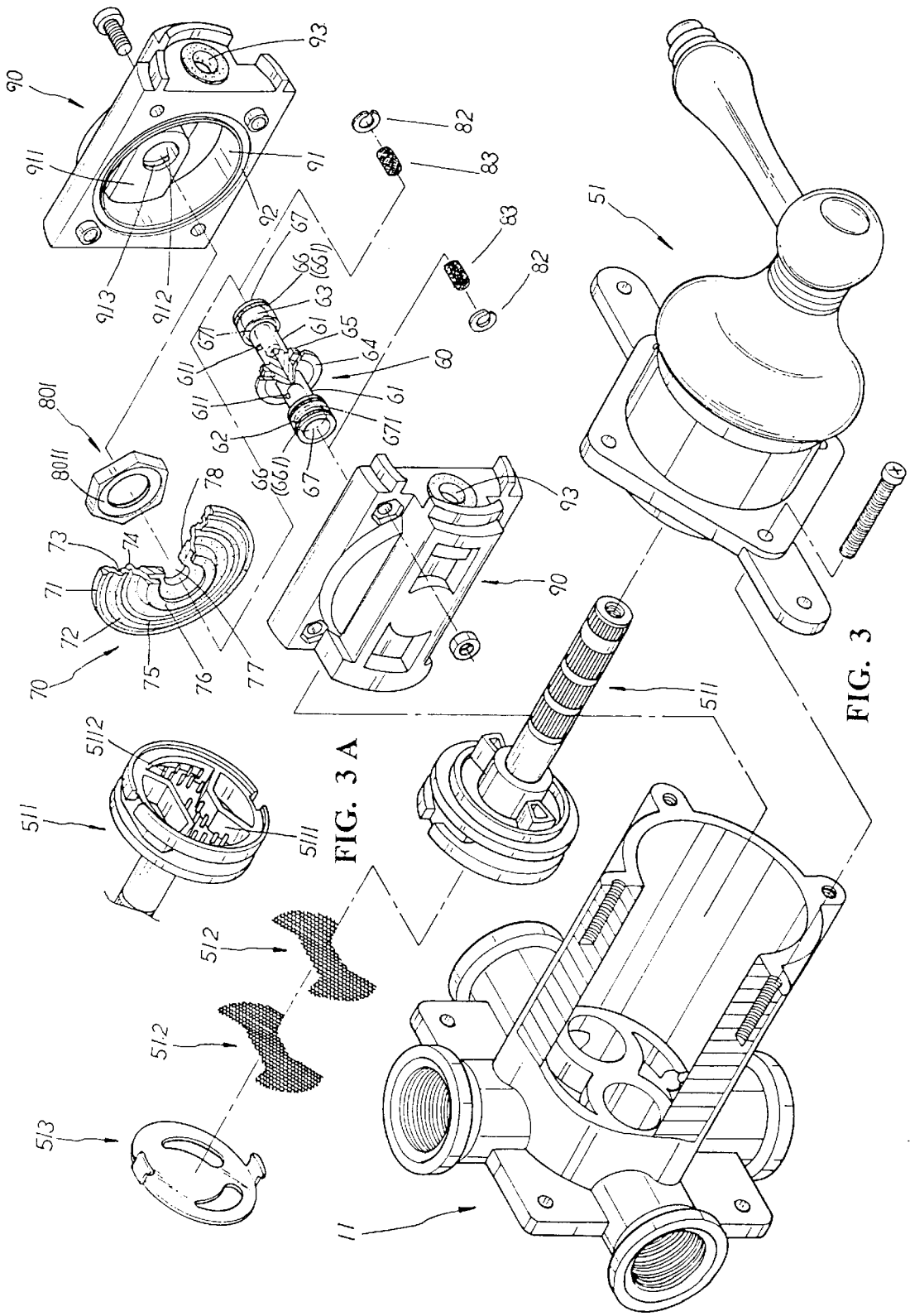
FIG. 3 is a perspective diagram showing the exploded components of the present invention.

Referring to FIGS. 3, 3A, the present invention is comprised of a faucet body 11, a control knob mount 51, a valve control shaft 511, a pair of silencing screens 512, a fixing plate 513, a balance rod 60, a balance diaphragm 70, a compression nut 801, a pair of snap rings 83, two silencing blocks 84, and a pair of balancer cases 90.

As shown in FIG. 3A, at the other end of the valve control shaft 511 is defined a cylindrical receiving space having a bone-shaped mixing chamber 5111 disposed therein, in which are disposed a plurality of upright turbulence rods 5112. Each silencing plate 512 is a bone-shaped net full of tiny grids and is in fit engagement with the bone-shaped mixing chamber 5111.

The dumb-like balance rod 60 has a small-diameter rod 61 having a cylindrical hot water passage section 62 and a cylindrical cold water passage section 63 at the respective ends thereof. Both the hot water and cold water passage sections 62, 63 have a larger diameter than the small-diameter rod 61. The cold water passage section 63 has one sealing groove 66 with which is engaged a seal ring 661. The hot water passage section 62 is provided with a pair of sealing grooves 66 with which are engaged a seal ring 661 respectively.

Near the middle of the dumb-like balance rod 60 and adjacent the hot water passage section 62 is disposed a peripheral stop collar 64 next to which is disposed a threaded flange 65. At each end of the balance rod 60 is disposed a countersink socket 67. In the large section of each socket 67 is disposed a peripheral recess 671 for reception of a C-shaped clamping ring 83. On the wall of the small section of each socket 67 is positioned a pressure regulating bore 611 in communication with the small section of each socket 67.

The balance diaphragm 70 made of rubber and having a wave-like cross section is provided with an engagement rim 71 on the periphery thereof. On one side of the diaphragm 70 subject to hot water and next to the engagement rim 71 is disposed a large adjustment rib 72. On the opposite side of the diaphragm 70 subject to cold water is defined a large adjustment groove 73 and a loop of small adjustment rib 74 is disposed next to the inner side of the groove 73. To the opposite side of the small adjustment rib 74 is formed a small adjustment groove 75.

On the cold water side of the diaphragm 70 and at the inner side of the small adjustment groove 75 is disposed a closing rim projection 76 which is opposite to a circle of a retaining flange 78 on the other side of the diaphragm 70.

At the center of the balance diaphragm 70 is disposed a central hole 77. The compression nut 801 has a ring cavity 8011 on one side thereof. The silencing blocks 84 rolled into cylindrical shape by a net-like member respectively are placed at each small-diameter rod 61 of the countersink socket 67 of the balance rod 60.

Each of the balancer cases 90 is provided with a chamber cavity 91 which has a peripheral shoulder 92 and at the bottom and middle section of each case 90 is positioned a protruded block 911 in a horizontal direction, extending from rim to the center of each case 90. A round cavity 912 is disposed at the end of the protruded block 911 with a lateral water inlet 913 defined on the wall of the round cavity 912. On one front end of the case 90 is disposed a water outlet 93 in communication with the chamber cavity 91.

Figure 4:
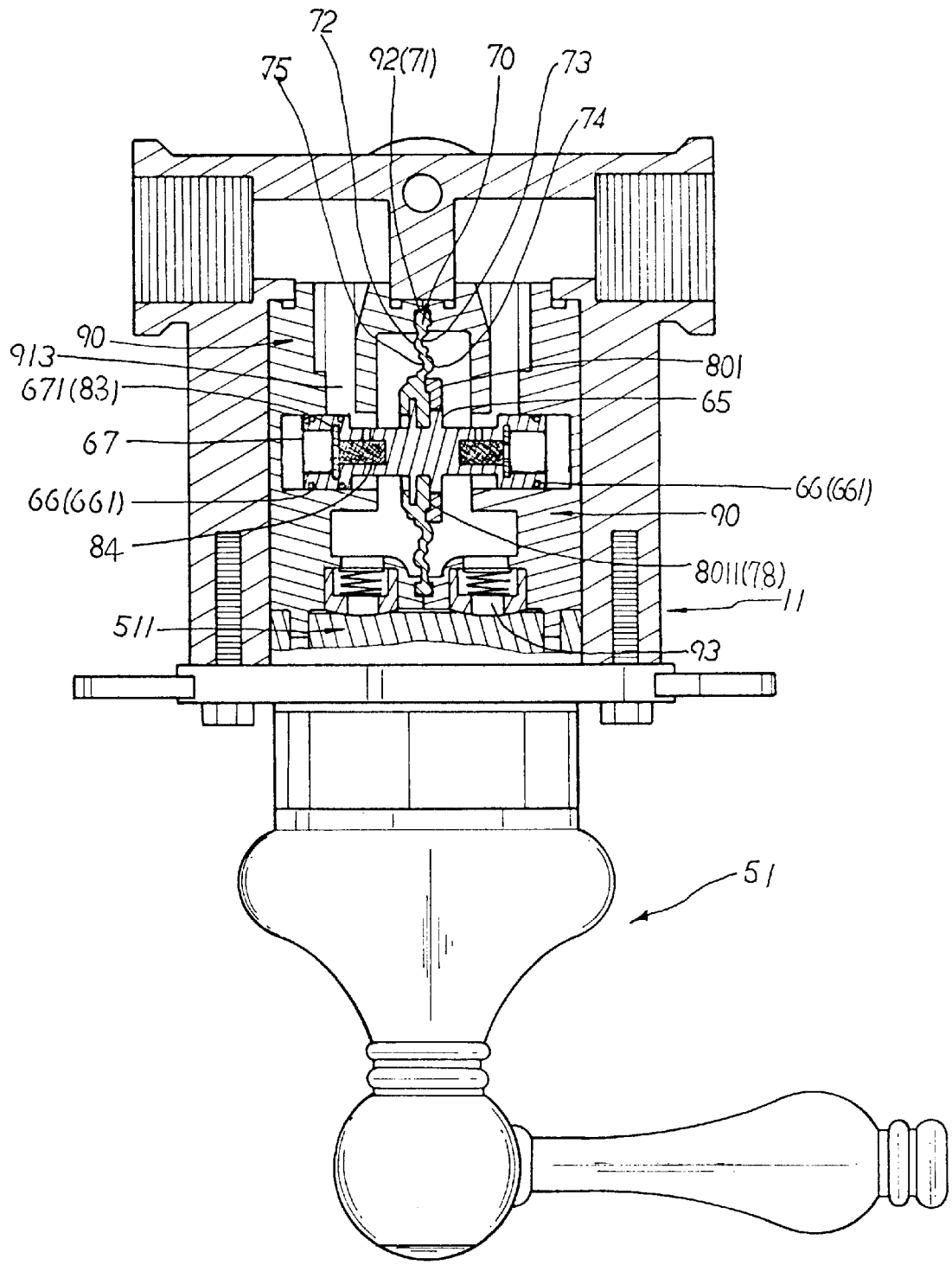
FIG. 4 is a sectional diagram showing the assembly of the present invention.

In assembly, as shown in FIG. 4, the central hole 77 of the rubber balance diaphragm 70 is elastic enough to be expanded outwardly to pass through the bulged cold water passage section 63 and the threaded flange 65. The diaphragm 70 is finally located in registration with a recess disposed between the stop collar 64 and the threaded flange 65. The compression nut 801 led through the cold water passage section 63 is engaged with the threaded flange 65 and is in supporting abutment against the balance diaphragm 70. It makes the retaining flange 78 of the balance diaphragm 70 registered with the ring cavity 8011 of the compression nut 801 and the closing rim projection 76 in abutment against the stop collar 64 of the balance rod 60. A silencing block 84 placed in the small-diameter section of the countersink socket 67 is retained in place by a C-shaped snap ring 83 which is located in a receiving groove 671 of the large-diameter section of the countersink socket 67, preventing the silencing block 84 from disengagement in use.

The balance rod 60 along with the balance diaphragm 70 is held in place between the two symmetric balancer cases 90. At the same time the hot water passage section 62 and the cold water passage section 63 are registered with the round cavity 912 of the internal protruded block 911 of the chamber cavity 91 in the respective case 90. Thus, the peripheral engagement rim 71 of the diaphragm 70 is registered with the peripheral recesses 92 of the chamber cavity 91 of the balance cases 90. The balancer cases 90 are then fixed together by bolts and nuts. The whole assembly is placed inside the faucet body 11 and a pair of overlapped silencing screens 512 are positioned in a mixing chamber 5111 disposed at one end of a valve control shaft 511. A fixing plate 513 is used to confine the silencing screens 512 inside the mixing chamber 5111. Then, the control knob mount 51 with the valve control shaft 511 is secured to the opened end of the faucet body 11 by screws.

In practical use, when the control knob of the faucet is adjusted to a proper position for discharge of water at a desired temperature, the hot water passage section 62 and the cold water passage section 63 are partially blocking the lateral water inlets 913 of the balance cases 90. Moreover, the silencing blocks 84 inside the countersink sockets 67 can effectively reduce operational noise when water passes therethrough. Once other hot water or cold water branches are in use at the same time, water pressure in the cases 90 will be dropped accordingly, and the large adjusting rib 72 (large adjusting groove 73) or the small adjusting rib 74 (small adjusting groove 75) will deform evenly toward the hot water side or cold water side so as to avoid abnormal deformation on the diaphragm 70 that can cause the balance rod 60 to move out of its precise position when moving reciprocally between the balance cases 90 along its concentric axis of the rod 60. Thus, the rod 60 is made to move smoothly toward the hot water side or cold water side of the balance cases 90.

By way of the pressure regulating bores 611 of the balance rod 60, pressure can be adjusted so as to prevent vacuum states, which will cause the hot or cold water passage section 62, 63 to move abnormally, from being produced in the round cavities 912 of the cases 90. The seal rings 661 on the hot water passage section 62 and cold water passage section 63 can stop excessive water from permeation. The opening level of lateral water inlets 913 on the inner wall of the round cavities 912 of the balance cases 90 can be increased in correspondence to the registration level of the hot water passage section 62 and the cold water passage section 63 with the round cavities 912. The larger the opening level of either cold or hot water inlets 913 is, the more the cold water or hot water discharge volume becomes; accordingly, the increased water pressure will push the diaphragm 70 back to an original temperature balance position. With the help of the compression nut 801 which is in supporting abutment against one side of the diaphragm 70, water pressure can be effectively or directly exerted on the diaphragm 70 so as to move the balance rod 60 smoothly toward the cold or hot water balancer case 90. Thus, the balance rod 60 can be kept in a preset temperature balance position. When hot and cold water flow in the mixing chamber 5111 of the valve control shaft 511 via the two silencing screens 512 and the turbulence rods 5112 of the mixing chamber 5111, noise produced in the running water can be reduced effectively.

Figure 5:
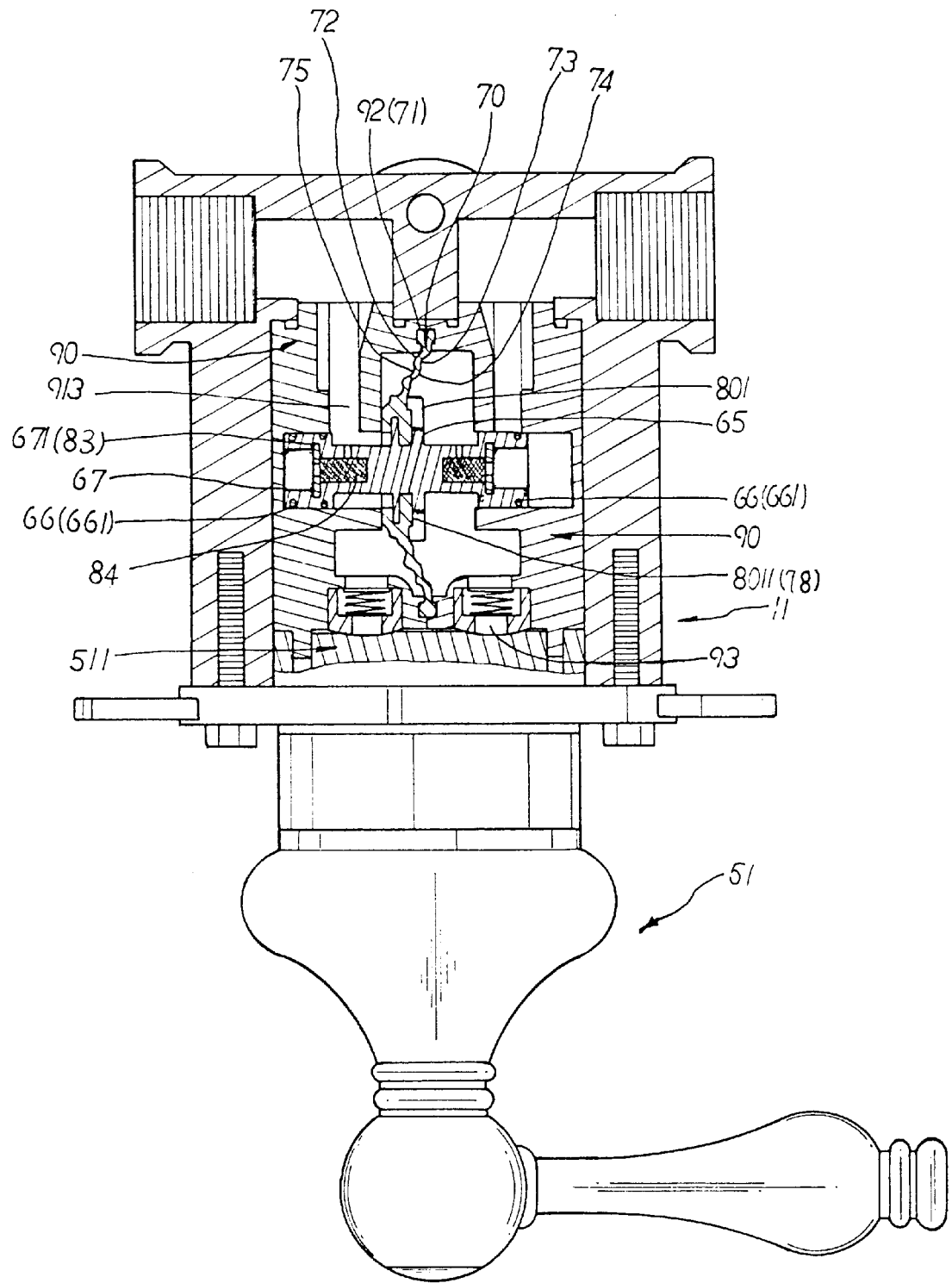
FIG. 5 is a diagram showing the operation mode of the present invention.

Referring to FIG. 5, the present invention can effectively protect people from being scalded by hot water. In case the valve control knob of the control knob mount 51 is accidentally shifted to an extreme position at which hot water at high temperature is discharged from the faucet, it will cause the water pressure at the cold water side is higher than the hot water side. At the instant, the balance diaphragm 70 is pushed by the water pressure at the cold water side to deform in curvature. It renders the closing rim projection 76 at the hot water side of the balance diaphragm 70 to lean against the periphery of the round cavity 912 at the end of the protruded block 911, as shown in FIG. 5, to stop hot water flushing out continuously. Thus, people can be well protected from being scalded by hot water accidentally.

It can be apparently seen that the improved pressure balancer of the present invention has the following advantages:

1. The threaded flange 65 disposed at the cold water passage section of the balance rod 60 can help the diaphragm 70 firmly abut against the stop collar 64 by the compression nut 801 engaged with the threaded flange 65 in assembly so as to prevent the diaphragm 70 from overturning in operation as a result of an excessive pressure.
2. The use of the silencing blocks 84 in the two countersink sockets 67 and the turbulence rods 5112 and the silencing screens 512 in the mixing chamber 5111 of the valve control shaft 511 can effectively reduce the operational noise of the running water in the faucet.

I claim:
1. An improved pressure balancer comprising a faucet body, a control knob mount, a valve control shaft, a pair of silencing screens a fixing plate, a balance rod, a balance diaphragm, a compression nut, a pair of snap rings, two silencing blocks, and a pair of balancer cases; wherein one end of said valve control shaft is defined a cylindrical receiving space having a bone-shaped mixing chamber disposed therein;

said balance rod has a small-diameter rod having a large-diameter cylindrical hot water passage section and a large-diameter cylindrical cold water passage section at the respective ends thereof; both said hot water and cold water passage sections have a larger diameter than the small-diameter rod; said cold water passage section has one sealing groove with which is engaged a seal ring; the hot water passage section is provided with a pair of sealing grooves with which are engaged a seal ring respectively; near the middle of said balance rod and adjacent the hot water passage section is disposed a peripheral stop collar;

at each end of said balance rod is disposed a countersink socket; in a large section of each countersink socket is disposed a peripheral recess for reception of a C-shaped clamping ring; on the wall of a small section of each said socket is positioned a pressure regulating bore in communication with the small section of each socket;

said balance diaphragm made of rubber and having a wave-like cross section is provided with an engagement rim on the periphery thereof; on one side of the diaphragm subject to hot water and next to the engagement rim is disposed a large adjustment rib; on the opposite side of said diaphragm subject to cold water is defined a large adjustment groove and a loop of small adjustment rib is disposed next to the inner side of the groove and a retaining flange is also disposed around a central hole of said balance diaphragm; to the opposite side of said small adjustment rib is formed a small adjustment groove;

said balance rod with said diaphragm removably mounted to the center thereof is housed in a space defined by said two cases in combination; and said integrally combined cases are placed in said faucet body, and said control valve shaft is engaged with said control knob mount which is operationally secured to said faucet body; the improvement is characterized by that:

at one end of said valve control shaft being disposed a mixing chamber in which a plurality of axially extended turbulence rods being placed and a pair of silencing screens made of net-like material being confined in said mixing chamber; and a fixing plate having water passage holes being engaged with an opening of said mixing chamber so as to confine said silencing screens in said mixing chamber;

said compression nut having one side provided with a ring cavity;

a pair of silencing blocks made of rolled net-like material;

said silencing blocks being disposed in said small diameter section of said countersink sockets of said balance rod respectively;

a receiving groove being disposed at a joint position of said small diameter section and said large diameter section of said countersink socket so as to permit a C-shaped snap ring used to retain one silencing block in place to be housed therein;

a threaded flange being disposed next to said stop collar so as to permit said balance diaphragm to be retained in place between said stop collar and said compression nut secured to said threaded flange;

said compression nut having one side in abutment against said diaphragm provided with a ring cavity with which said retaining flange of said diaphragm being registered whereby said balance diaphragm is not easily overturned by excessive water pressure and noise produced by running water in said faucet body can be effectively minimized.

* * * * *